United States Patent
Christian

(10) Patent No.: US 11,445,340 B2
(45) Date of Patent: *Sep. 13, 2022

(54) ANOMALOUS SUBJECT AND DEVICE IDENTIFICATION BASED ON ROLLING BASELINE

(71) Applicant: Flying Cloud Technologies, Inc., Polson, MT (US)

(72) Inventor: Brian P. Christian, Sioux Falls, SD (US)

(73) Assignee: Flying Cloud Technologies, Inc., Polson, MT (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/154,915

(22) Filed: Jan. 21, 2021

(65) Prior Publication Data

US 2022/0232356 A1 Jul. 21, 2022

(51) Int. Cl.
*H04W 4/35* (2018.01)
*H04W 4/021* (2018.01)
(Continued)

(52) U.S. Cl.
CPC ............ *H04W 4/35* (2018.02); *G06K 9/6215* (2013.01); *G06K 9/6272* (2013.01);
(Continued)

(58) Field of Classification Search
CPC .......... H04W 4/35; H04W 4/38; H04W 4/80; H04W 4/021; H04W 4/023; H04W 84/18; G06K 9/6215; G06K 9/6272
See application file for complete search history.

(56) References Cited

U.S. PATENT DOCUMENTS 7,065,657 B1  6/2006  Moran
7,114,002 B1  9/2006  Okumura et al.
(Continued)

FOREIGN PATENT DOCUMENTS

| KR | 20020081119 A | * | 10/2002 | |
|---|---|---|---|---|
| WO | 2014-138115 A1 | | 9/2014 | |
| WO | WO-2016057564 A1 | * | 4/2016 | ............. G06Q 10/06 |

OTHER PUBLICATIONS

Atefi et al., A Hybrid Intrusion Detection System based on Different Machine Learning Algorithms, Proceedings of the 4th International Conference on Computing and Informatics, Paper No. 022, Aug. 2013, pp. 312-320.
(Continued)

*Primary Examiner* — Dung Hong
(74) *Attorney, Agent, or Firm* — Asif Ghias

(57) ABSTRACT

Techniques are disclosed for identifying anomalous subjects and devices at a site. The devices may or may not be carried by or associated with subjects at the site. A number of various types of sensors may be utilized for this purpose. The sensors gather data about the subjects and devices. The data is processed by a data processing module which provides its output to a rolling baseline engine. The rolling baseline engine establishes a baseline for what is considered the "normal" behavior for subjects/devices at the site based on a desired dimension of analysis. Data associated with subjects/devices that is not normal is identified as an anomaly along with the associated subject/device. The findings are archived for performing analytics as required.

20 Claims, 9 Drawing Sheets

(51) Int. Cl.

| | |
|---|---|
| H04W 4/02 | (2018.01) |
| G06K 9/62 | (2022.01) |
| H04W 4/80 | (2018.01) |
| H04W 84/18 | (2009.01) |
| H04W 4/38 | (2018.01) |

(52) U.S. Cl.
CPC ............ *H04W 4/021* (2013.01); *H04W 4/023* (2013.01); *H04W 4/38* (2018.02); *H04W 4/80* (2018.02); *H04W 84/18* (2013.01)

(56) References Cited

U.S. PATENT DOCUMENTS

| | | |
|---|---|---|
| 7,260,846 B2 | 8/2007 | Day |
| 8,161,550 B2 | 4/2012 | Keen et al. |
| 8,213,313 B1 | 7/2012 | Doiron et al. |
| 8,276,202 B1 | 9/2012 | Dubrovsky et al. |
| 8,448,234 B2 | 5/2013 | Mondaeev et al. |
| 8,762,298 B1 | 6/2014 | Ranjan et al. |
| 8,782,790 B1* | 7/2014 | Smith ................. H04L 63/1441 726/24 |
| 8,793,790 B2 | 7/2014 | Khurana et al. |
| 8,997,227 B1 | 3/2015 | Mahtre et al. |
| 9,060,014 B2 | 6/2015 | Crowley |
| 9,083,740 B1 | 7/2015 | Ma et al. |
| 9,094,288 B1 | 7/2015 | Nucci et al. |
| 9,106,687 B1 | 8/2015 | Sawhney et al. |
| 9,430,646 B1 | 8/2016 | Mushtaq et al. |
| 10,142,785 B2 | 11/2018 | Wootton et al. |
| 10,542,026 B2 | 1/2020 | Christian |
| 10,542,027 B2 | 1/2020 | Wittenschlaeger |
| 10,573,146 B1* | 2/2020 | Jordan, II ............. H04W 4/024 |
| 10,594,714 B2 | 3/2020 | Crabtree et al. |
| 10,848,514 B2* | 11/2020 | Christian ............... G06N 99/00 |
| 10,887,330 B2* | 1/2021 | Christian ................ H04L 63/12 |
| 2005/0210533 A1 | 9/2005 | Copeland et al. |
| 2007/0220588 A1 | 9/2007 | Panda et al. |
| 2010/0153316 A1 | 6/2010 | Duffield et al. |
| 2012/0233222 A1 | 9/2012 | Roesch |
| 2014/0165201 A1 | 6/2014 | Wittenschlaeger |
| 2015/0082456 A1 | 3/2015 | Eren et al. |
| 2015/0096024 A1 | 4/2015 | Haq et al. |
| 2015/0163121 A1 | 6/2015 | Mahaffey et al. |
| 2015/0205962 A1 | 7/2015 | Swidowski et al. |
| 2016/0014154 A1 | 1/2016 | Huang et al. |
| 2016/0021081 A1* | 1/2016 | Caceres ................. H04L 63/08 726/7 |
| 2016/0294704 A1 | 10/2016 | Fan et al. |
| 2016/0295422 A1 | 10/2016 | Fan et al. |
| 2016/0301707 A1 | 10/2016 | Cheng et al. |
| 2016/0373409 A1 | 12/2016 | Zhu et al. |
| 2017/0099196 A1 | 4/2017 | Barsheshet et al. |
| 2017/0171234 A1 | 6/2017 | Christian |
| 2017/0302665 A1 | 10/2017 | Zou et al. |
| 2018/0349628 A1* | 12/2018 | Bender ............... G06F 21/6218 |
| 2020/0019931 A1* | 1/2020 | Prabhakar .......... G06Q 10/0838 |
| 2020/0204574 A1 | 6/2020 | Christian |

OTHER PUBLICATIONS

Eihaskar et al., A Hybrid Model for Network Security Systems Integrating Intrusion Detection System with Survivability, International Journal of Network Security, vol. 7, No. 2, Sep. 2008, pp. 249-260.

C-DAC Bangalore Electronics City, Analysis of Network Packets, presentation, pp. 1-39, CDAC, Bangalore, India.

Chan et al., Machine Learning for Computer Security, Journal of Machine Learning Research 7, 2006, pp. 2669-2672.

Demertzis et al., A Hybrid Network Anomaly and Intrusion Detection Approach Based on Evolving Spiking Neural Network Classification, CCIS 441, 2014, pp. 11-23, DOI: 10.1007/978-3-319-11710-2_2.

Devi K. J et al, Hybrid Intrusion Detection with Weighted Signature Generation, International Journal of Computer Applications in Engineering Sciences vol. 1, Issue IV, Dec. 2011, pp. 450-453, ISSN: 2231-4946.

Extrahop, Universal Payload Analysis, Fact Sheet, pp. 1, ExtraHop, Seattle, WA, USA.

Fireeye, AX Series Forensic Analysis Platforms that Provide a Full 360-degree View of a Cyber Attack, Fact Sheet, 2014, pp. 1-3, FireEye Inc., Milpitas, CA, USA.

FLIR, "FLIR Screen-EST Skin Temperature Screening Software", http://www.flir.com, Sep. 17, 2020, pp. 1-2, FLIR Systems Inc., Wilsonville, OR, USA.

Garcia-Teodoro et al, Network-based Hybrid Intrusion Detection and Honeysystems as Active Reaction Schemes, IJCSNS International Journal of Computer Science and Network Security, vol. 7 No. 10, Oct. 2007, pp. 62-70.

Hashim, The Integration of Snort with K-Means Clustering Algorithm to Detect New Attack, presentation, Fakultat fur Informatik Technische, 2011, pp. 1-14, Munich, Germany.

Hijazi, Network Traffic Characterization Using (p, n)-grams Packet Representation, Thesis for Doctor of Philosophy, Carleton University, 2014, Ontario, Canada.

Hwang et al., Hybrid Intrusion Detection with Weighted Signature Generation over Anomalous Internet Episodes, IEEE Transactions on Dependable and Secure Computing, vol. 4, No. 1, Jan.-Mar. 2007, pp. 1-15.

Icetana, "Milestone Certified Solution", http://www.milestonesys.com, Sep. 17, 2020, pp. 1-13, Milestone Systems A/S, Brondby, Denmark.

Intel, A Well-Connected Sandbox, Solution Brief, pp. 1-5, 2015, McAfee, Part of Intel Security, Santa Clara, CA, USA.

Jawhar et al., Design Network Intrusion Detection System using hybrid Fuzzy-Neural Network, International Journal of Computer Science and Security, vol. (4): Issue (3), 2010, pp. 285-294.

Jeyanna et al., A Network Intrusion Detection System Using Clustering and Outlier Detection, International Journal of Innovative Research in Computer and Communication Engineering, vol. 3, Issue 2, Feb. 2015, pp. 975-982, ISSN Online): 2320-9801, ISSN (Print): 2320-9798.

Juvonen et al., Combining Conjunctive Rule Extraction with Diffusion Maps for Network Intrusion Detection, authors' postprint version of the article. The original print version appeared in The Eighteenth IEEE Symposium on Computers and Communications (ISCC 2013). IEEE 2013. Available online at http://ieeexplore.ieee.org/stamp/stamp.jsp?p=&arnumber=6754981&isnumber=6754912.

Kizza, Guide to Computer Network Security, Chapter 13: System Intrusion Detection and Prevention, 2009.

Kornblum, Jesse, "Identifying Almost Identical Files Using Context Triggered Piecewise Hashing", The Digital Forensic Research Conference (DFRWS), Aug. 14-16, 2006, Science Direct, Elsevier, 8 pgs.

Madbouly et al., Relevant Feature Selection Model Using Data Mining for Intrusion Detection System, International Journal of Engineering Trends and Technology (IJETT)—vol. 9 No. 10—Mar 2014, pp. 501-512, ISSN:2231-5381.

McCaffrey, Data Clustering—Detecting Abnormal Data Using k-Means Clustering, Microsoft Developer Network (MSDN) Magazine, Feb. 2013, pp. 1-17.

Mrdovic, Network packet payload analysis for intrusion detection, University of Sarajevo, 2006, pp. 1-6, Sarajevo, Bosnia.

Munz et al., Signature Detection in Sampled Packets, publication of Wilhelm Schickard Institute for Computer Science, University of Tuebingen, 2007, pp. 1-6, Tuebingen, Germany.

Munz et al., Traffic Anomaly Detection Using K-Means Clustering, publication of Wilhelm Schickard Institute for Computer Science, University of Tuebingen, 2007, pp. 1-8, Tuebingen, Germany.

Omar et al., Machine Learning Techniques for Anomaly Detection: An Overview, International Journal of Computer Applications (0975-8887) vol. 79—No. 2, Oct. 2013, pp. 33-41.

Payload Security, VxStream Sandbox—Automated Malware Analysis System, Fact Sheet, 2015, Germany.

(56) References Cited

OTHER PUBLICATIONS

Perona et al, Service-independent payload analysis to improve intrusion detection in network traffic, Australian Computer Society, Inc., Seventh Australasian Data Mining Conference AusDM 2008, Glenelg, Australia.

Prathibha KS et al, Analysis of Hybrid Intrusion Detection System Based on Data Mining Techniques, International Journal of Engineering Trends and Technology (IJETT)—vol. 15 No. 9—Sep 2014, pp. 448-452, ISSN: 2231-5381.

Rashida, Hybrid Architecture for Distributed Intrusion Detection System in Wireless Networks, International Journal ol Network Security & Its Applications (IJNSA), vol. 5, No. 3, May 2013, pp. 45-54, DOI: 10.5121/ijnsa.2013.5305.

Sedjelmaci et al., Novel Hybrid Intrusion Detection system for Clustered Wireless Sensor Network, International Journal of Network Security & Its Applications (IJNSA), vol. 3, No. 4, Jul. 2011, pp. 1-14.

Seyyedi et al, High Payload and Secure Steganography method Based on Block Partitioning and Integer Wavelet Transform, International Journal of Security and Its Applications vol. 8, No. 4, 2014, pp. 183-194 http://dx.doi.org/10.14257/ijsia.2014.8.4.17.

Shanmugam et al, Hybrid Intrusion Detection Systems (HIDS) using Fuzzy Logic, Intrusion Detection Systems, Dr. Pawel Skrobanek (Ed.), ISBN: 978-953-307-167-1, InTech, Available from: http://www.intechopen.com/books/intrusion-detection-systems/hybrid-intrusion-detection-systems-hids-using-fuzzy-logic, 2011, pp. 136-154, Kuala Lumpur, Malaysia.

Shon et al, A hybrid machine learning approach to network anomaly detection, Information Sciences 177, 2007, pp. 3799-3821, doi: 10.1016/j.ins.2007.03.025.

Smutz, Network Payload Analysis for Advanced Persistent Threats, presentation, Lockheed Martin GIRT, 2010, pp. 1-36.

Stiawan et al, Characterizing Network Intrusion Prevention System, International Journal of Computer Applications (0975-8887) vol. 14—No. 1, Jan. 2011, pp. 11-18.

Summers, Packet Analysis Reference Guide v3.0, CISSP—ISSAP, ISSMP, CISA, 4001 Rec, 2008, pp. 1-46.

Tesfahun et al., Effective Hybrid Intrusion Detection System: A Layered Approach, I. J. of Computer Network and Information Security, Feb. 2015, pp. 35-41, DOI: 10.5815/ijcnis.2015.03.05.

Wang et al, Network Anomaly Detection: A Survey and Comparative Analysis of Stochastic and Deterministic Methods, Boston University research publication, 2013, pp. 1-7, Boston, MA, USA.

Wang, Network Payload-based Anomaly Detection and Content-based Alert Correlation, Submitted in partial fulfillment of the requirements for the degree of Doctor of Philosophy in the Graduate School of Arts and Sciences, Columbia University, 2006.

Zanero, Analyzing TCP Traffic Patterns Using Self Organizing Maps, publication, D.E.I.-Politecnico di Milano, via Ponzio 34/5-20133, 2005, pp. 1-8, Milan, Italy.

Zhang et al, Improvments of Payload-based Intrusion Detection Models by Using Noise Against Fuzzy SVM, Journal of Networks, vol. 6, No. 2, Feb. 2011, pp. 330-340.

* cited by examiner

ANOMALOUS SUBJECT AND DEVICE IDENTIFICATION BASED ON ROLLING BASELINE

RELATED APPLICATIONS

This application is related to U.S. patent application Ser. No. 16/120,704, now U.S. Pat. No. 10,542,026 B2 issued on Jan. 21, 2020 and which is incorporated by reference herein for all purposes in its entirety.

FIELD OF THE INVENTION

This invention relates to the field of crowd surveillance and monitoring for the purposes of identifying threats and issues of various kinds.

BACKGROUND ART

Surveillance of sites and properties for the purposes of proactively identifying threats and malicious actors is an active area of pursuit. The importance of early detection of health scares and other security threats in the age of global pandemics cannot be overstated. As a result, there is lot of active research on trying to identify health, security and other threats in crowded spaces, sites and various facilities.

Much of the focus has unsurprisingly been on information or information security thus far. U.S. Pat. No. 10,594,714 B2 to Crabtree describes a cybersecurity system that protects against cyberattacks by performing user and device behavioral analysis using an advanced cyber decision platform which creates a map of users and devices attached to a network. It then develops a baseline of expected interactions and behaviors for each user and device in the map, and monitors deviations from the expected interactions and behaviors.

U.S. Pat. No. 10,542,027 B2 to Wittenschlaeger discloses a hybrid-fabric apparatus that comprises a black box memory configured to store a plurality of behavior metrics and an anomaly agent coupled to the black box. The anomaly agent determines a baseline vector corresponding to nominal behavior of the fabric, wherein the baseline vector comprises at least two different behavior metrics that are correlated with each other. The anomaly agent disaggregates anomaly detection criteria into a plurality of anomaly criterion to be distributed among network nodes in the fabric.

U.S. Pat. No. 10,542,026 B2 to Christian teaches a data surveillance system for the detection of security issues, especially of the kind where privileged data may be stolen by steganographic, data manipulation or any form of exfiltration attempts. Such attempts may be made by rogue users or admins from the inside of a network, or from outside hackers who are able to intrude into the network and impersonate themselves as legitimate users. The system and methods use a triangulation process whereby analytical results pertaining to data protocol, user-behavior and packet content are combined to establish a baseline for the data. Subsequent incoming data is then scored and compared against the baseline to detect any security anomalies. A centroid representing the normal population of the data packets is identified. The design allows establishing the context of various events of interest in the organization, thus enabling dynamic management of security policies.

In the area of detecting the presence of humans or bodies in a network, U.S. Pat. No. 10,142,785 B2 to Wootton teaches systems and methods for detecting the presence of a body in a network without fiducial elements. It does so using signal absorption, and signal forward and reflected backscatter of radio frequency (RF) waves caused by the presence of a biological mass in a communications network.

In the area of surveillance monitoring, the product of iCetana™ proclaims a set of advanced, automated, video analysis tools that provide for the immediate detection and extraction of events and valuable data from surveillance footage. It is purported to increase the return on investment (ROI) of a surveillance system, and overall security, safety and business operations. The integration capabilities allow it operate on every camera connected to the surveillance system. The product claims to detect anomalies, enabling full event management through the client. This includes event notification with graphic overlay for both live and recorded (playback) video, simplified configuration, triggered recording, activation of outputs and more. Video search and business intelligence capabilities are embedded in the client, enabling retrieval of stored video and display of analytics results.

The product of FLIR™ proclaims a desktop software offering an efficient, accurate way to perform elevated skin temperature screenings at ports of entry, checkpoints, building entrances, and other high-traffic areas. When connected to a thermal camera, the software activates as an individual enters the camera's field of view and provides guidance to correctly position them. The software places a hot spot on the individual's face and takes a skin temperature measurement within seconds. If the measured temperature exceeds a threshold set above the rolling baseline average, the system will notify the operator and present an alarm on the subject's viewing monitor. The individual can then be directed to a secondary screening with a medical device. This rapid, non-contact measurement system sets up in minutes, and helps organizations reduce the risk of work and production interruptions due to illness.

One of the shortcomings of the prior art is that it fails to teach techniques that allow identifying of anomalous subjects and devices based on a rolling baseline in a crowded site containing a variety of sensors. Such a design absent from the art would gather data from all the sensors and analyze them by first establishing a rolling baseline by clustering of data packets and then scoring each incoming packet against a centroid of the baseline. As a result, the system absent from the art would allow the identification of anomalous subjects and devices at a site/environment such as health and security threats, training issues, espionage, etc.

The prior art is also silent about teaching the above techniques where the sensors would be installed on computing devices. The prevailing art is also silent about detecting various health, security or other scenarios when there are personal-devices carried by the subjects at a given site. The art is also silent about applying these techniques to monitoring valuable assets at a manufacturing site or facility.

OBJECTS OF THE INVENTION

In view of the shortcomings and unfulfilled needs of the prior art, it is an object of the present invention to provide a set of techniques for identifying anomalous subjects and devices at a site of interest.

It is also an object of the invention to achieve the above objectives by establishing a rolling baseline for data streams based on clustering of data packets and then scoring each incoming packet against a centroid of the rolling baseline.

It is also an object of the invention to gather data from a variety of sensors present at the site in order to achieve its objectives of anomalous subject and device identification.

It is also an object of the invention to allow the above sensors to be embodied in various types of computing devices so ubiquitously present in today's environments.

It is also an object of the invention to apply the above techniques for monitoring valuable assets at a site such as a manufacturing or fabrication facility.

It is also an object of the invention to attain greater fidelity in achieving its objectives by deploying antennas installed at the facility.

These as well as other objects of the invention will be evident in the forthcoming summary and detailed description sections of this disclosure.

SUMMARY OF THE INVENTION

The objects and advantages of the invention are secured by systems and methods for anomalous subject and device identification based on a rolling baseline. This is accomplished by deploying one or more sensors at a site at which anomalous subject and device identification is required. The sensors may be based on any suitable wired or wireless technology including video, audio, cellular, blue-tooth, radio frequency identification (RFID), Zigbee and thermal sensor technologies. Subjects or targets at the site may also be carrying communication devices of their own or personal-devices.

Data streams originating from the above subjects and personal-devices is gathered by the above sensors and analyzed by a rolling baseline engine taught in herein incorporated U.S. Pat. No. 10,542,026 issued on 21 Jan. 2020 to Christian. The baseline engine establishes a rolling baseline of data received from the sensors, preferably after processing by a data processing module. The rolling baseline is established by assignment of each incoming packet to a cluster of packets amongst clusters of packets of data. Preferably, the clustering is performed using k-means clustering.

The baseline thus established is characterized by a conceptual hypercube with any number and types of dimensions on which the data is desired to be analyzed. The hypercube has a centroid that represents the "normal" population of packets. Then, as subsequent packets arrive, they are scored against the baseline by computing their distance from the centroid of the hypercube. Any packets that are far away enough from the centroid on a dimension of interest to be not normal are then identified as anomalous along with the subject and/or device associated with that data packet. In this manner, the anomalous subject and device identification system of the present design is able to analyze data from a variety of different sensors deployed at a given on a variety of dimensions of interest and identify anomalous subjects and devices at the site.

In various preferred embodiments, the sensors are located on various computing devices including personal computing devices such as cellular phones such as smartphones, tablets, wearable devices such as smartwatches, laptops, even desktops, etc. The data analyzed by the baseline engine may be related to the subjects and/or devices carried by the subjects termed as personal-devices. The devices carried by the subjects may be cellular phones such as smartphones, tablets, wearable devices such as smartwatches, laptops, even desktops, etc.

In another set of embodiments, there are wireless antennas installed at the site. The antennas may act as personal-device sensors or they may boost the signal for other personal-device sensors present at the site. The antennas add fidelity to the system by allowing better location determination of devices at the site. For location determination, any network algorithm techniques such as triangulation, trilateration, etc. may be utilized by the data processing module, which then furnishes its output with subject, device and location data to the rolling baseline engine.

In various embodiments the baseline engine is used to perform analysis for a variety of aspects about the subjects/devices. Consequently, the distance of data packets associated with the subjects/devices at the site is determinative of a number of useful situations about anomalous subjects and devices at the site. These include knowing that the device has been beaconing in the unused media access control (MAC) address space for too long.

These situations/scenarios further include knowing movement patterns of the subject, temperature reading of the subject, police record of the subject, the lack of a personal-device carried by the subject, the transfer of a personal-device from one subject to another, a weapon carried by the subject, among others. The system is also able to identify scenarios with an anomalous device alone, such as an unattended device at the site that may or may not have been previously associated with a subject.

Preferably the data streams from the sensors are stored in a data file as separate data-tracks. For this purpose, data streams from multiple sensors of the same type may first be combined by the data processing module before storing them in the data file as data stream of a given type. Exemplary data-tracks include video data, audio data, radio frequency (RF) data, blue-tooth data, etc. Preferably, there is also an underlying data track containing information about the subjects associated with the data-tracks.

In another set of embodiments, the sensors are embodied in a computing device at a kiosk present at the site. Such embodiments are useful in presenting the capabilities of the system to the subjects and/or getting them familiarized with it. In other embodiments, the subjects are items or apparatus of value whose monitoring is required. For this purpose, asset sensors are utilized, which are typically wireless sensors that communicate with xmitters installed in or around the valuable assets. Exemplary implementations of such embodiments may be found at manufacturing/fabrication facilities where monitoring of expensive or sensitive manufacturing/fabrication equipment is required.

The present technology may be deployed at sites/locations including airports, train stations, subways, central bus stations, embassies and consulates, government buildings, stadiums, arenas, venues, convention centers, Fortune 500 companies' headquarters or key offices, hospitals, universities/colleges, schools, restaurants and hospitality centers, office buildings, etc. The scenarios including the involved subjects and devices proactively identified by the present anomalous subject and device identification technology include health threats, security threats, espionage, training issues, distressed individuals, etc. The findings of the baseline engine are archived in an on-premise database or in the cloud for performing downstream forensic or other analytics as needed.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
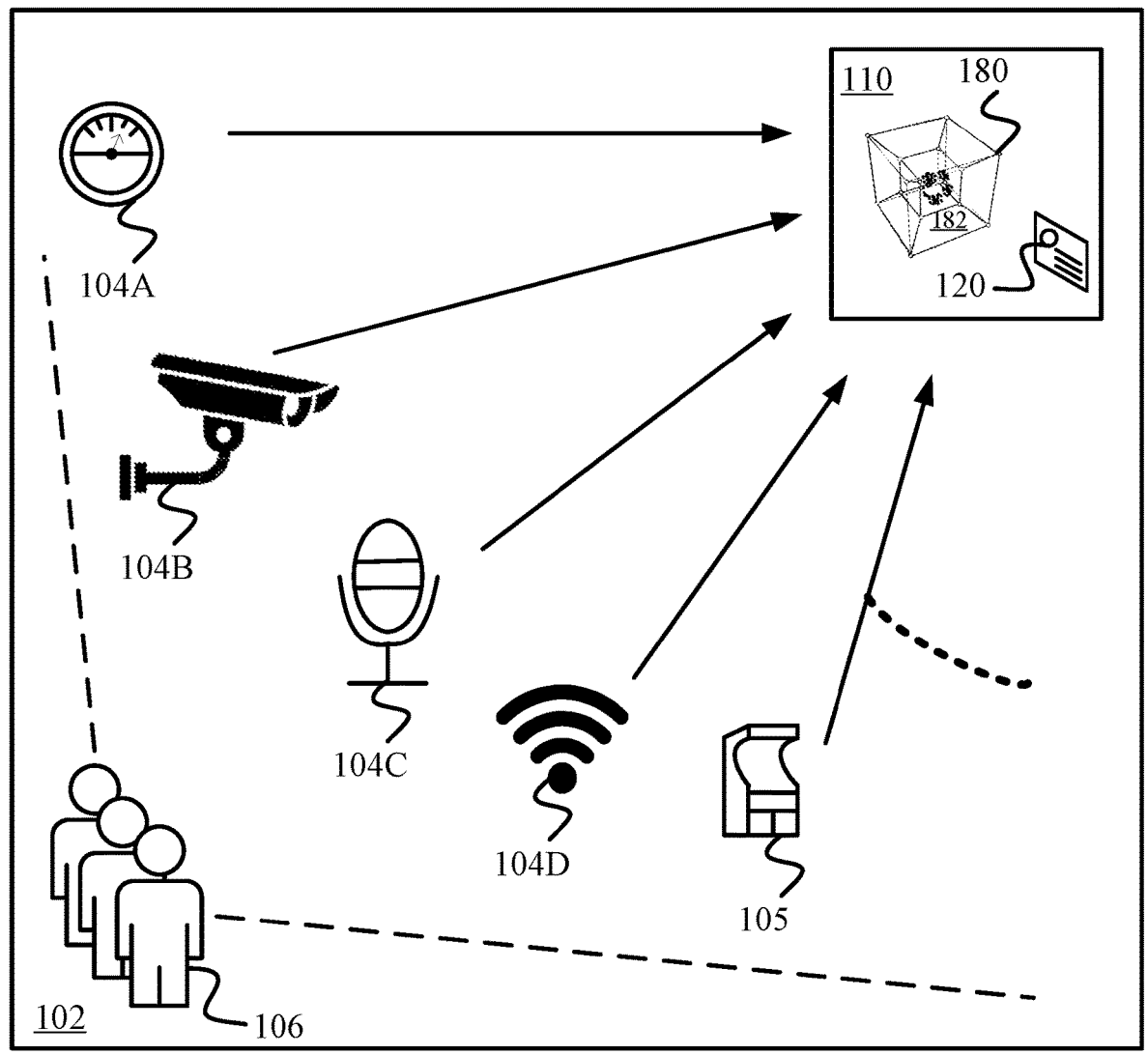
FIG. 1 is a conceptual diagram illustrating the anomalous subject and device identification system of the present design.

The techniques described herein may employ computer code that may be implemented purely in software, hardware, firmware or a combination thereof as required for a given implementation. The system and methods of the present technology will be best understood by first reviewing an anomalous subject and device identification system 100 as illustrated in FIG. 1. System 100 is a surveillance system comprising any number of sensors 104A, 104B, . . . 104N connected via a communication network (not shown) to a rolling baseline computation engine 110 at a site or an organization or an establishment or facility or property or environment 102.

Reference numerals 104A . . . 104N may represent anywhere from a single sensor up to hundreds or thousands or even more sensors as depicted by the dotted line, that may generate data for rolling baseline engine or for short baseline engine 110. Furthermore, non-limiting examples of these sensors are shown in FIG. 1. These include as one or more sensors 104A termed as asset sensors installed on or near or in vicinity or in proximity of valuable or sensitive assets, such as a manufacturing equipment or tools at a manufacturing or chip fabrication facility.

The sensors in FIG. 1 also include one or more sensors 104B that are picture or video cameras and one or more sensors 104C that are audio sensors such as microphones. These further include one or more sensors 104D that are wireless sensors such as wifi or bluetooth or Zigbee sensors and the like—these are termed as personal-device sensors because they are responsible for sensing/communicating with devices carried by subjects 206. FIG. 1 also shows one or more such sensors operating at a kiosk 105.

Any number and type of sensors 104A-N may be installed on one or more computing devices, such as mobile devices including cellular phones including smartphones. Sensors 104A-N may also be on tablets, and wearable devices such as smartwatches, even desktops, etc. It should further be noted that sensor(s) 104A may be one or more asset sensors, sensor(s) 104B may be one or more cameras, sensor(s) 104C may be one or more microphones that may or may not be integrated with camera(s) 104B, sensor(s) 104D may be one or more wireless personal-device sensors, examples of which were noted above, etc.

In this disclosure, unless otherwise explicitly noted, we may use reference numerals, for example reference numeral 104B to refer to a single sensor or multiple sensors of a given type, in this case camera or cameras. Any of sensors 104 may be operating in one or more kiosks, such as kiosk 105 at site 102. These sensors may be installed on one or more computing devices, fixed or mobile, enterprise or personal.

According to the present technology, sensors 104A . . . 104N gather data that is related to various subjects or targets 106. Subjects may be sentient beings, such as any sentient life forms or beings including animals or human beings shown in FIG. 1. Subjects also include non-living or non-sentient beings such as robots, automatons, cyborgs, as well as objects or assets of interest or value at site 101. In FIG. 1, sensors 104 are monitoring/surveilling human subjects 106 at site 102 and providing that data to baseline engine 110 for analysis, in order to accrue the benefits of the instant anomalous subject and device identification system 100 of the present design. Baseline engine 110 used by the present technology is the rolling baseline data surveillance system taught in detail in U.S. Pat. No. 10,542,026 issued on 21 Jan. 2020 to Christian, and which is incorporated by reference herein in its entirety for all purposes.

Explained further, baseline engine 110 analyzes each packet of data gathered by sensors 104. As a part of this analysis, it assigns each packet of data to a cluster of packets amongst clusters of packets of data. The clustering is done preferably by utilizing k-means clustering, specifically by utilizing Eq. (1) of the above-incorporated reference. As a result, baseline engine 110 establishes a rolling or evolving baseline 120 for the data that signifies the mean or normal behavior of the packets.

Baseline 120 is based on a conceptual hypercube 180 with a centroid 182 as shown in FIG. 1 representing the normal population of packets. For brevity, we may just refer to centroid 182 to be the centroid of baseline 120, rather than spelling out fully that centroid 182 is the centroid of hypercube 180 of baseline 120. Thus, as data packets from sensors 104A-N arrive via a communication network (not shown) at baseline engine 110, it scores these packets based on their distance from centroid 182 of baseline 120.

Since baseline 120 with centroid 182 signifies the "normal" behavior of packets, packets that are very far away from centroid 182 represent an anomaly. In this way, anomalous subject and device identification system 100 identifies anomalous subjects among subjects 106 that are associated with anomalous packets of data. Once again, for even a more detailed explanation of the workings of baseline engine 110 of anomalous subject and device identification system 100, that is responsible for establishing a rolling baseline 120 and then identifying anomalous data packets, the reader is referred to the above-incorporated reference of U.S. Pat. No. 10,542,026 issued on 21 Jan. 2020 to Christian.

Figure 2:
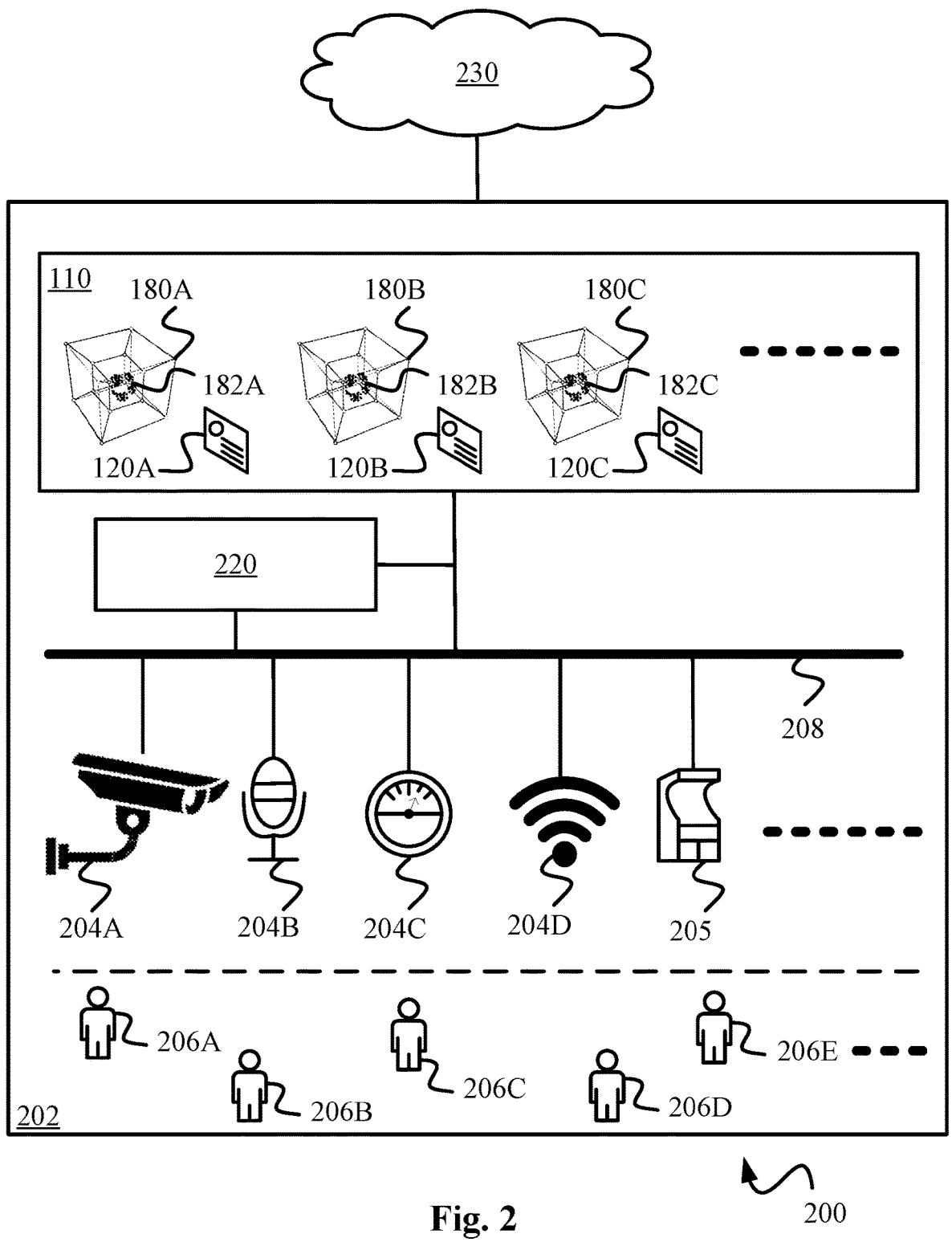
FIG. 2 is a detailed diagram illustrating various embodiments with various types of sensors used in the anomalous subject and device identification system of the present technology.

Now let us take a more detailed look at the present technology by reviewing its various embodiments and by taking advantage of FIG. 2. FIG. 2 shows an anomalous subject and device identification system 200 of the present design operating at a site 202. Site 202 has a number of subjects 206 per above explanation. In the example shown in FIG. 2, these subjects or targets are humans or people marked by reference numerals 206A, 206B, . . . . Also shown are a number of sensors of various types 204A, 204B, 204C, 204D, . . . per above discussion. Any number and types of such sensors 204A-N or simply sensors 204 may be present at site 202. All these sensors are connected to a network backbone 208 that is in turn connected to baseline engine 110 of the above teachings. Network backbone 208 is an electronic communications network based on techniques known in the art.

Furthermore, sensors 204 are collecting data about people 206A, 206B, . . . or simply people 206 at site 202 and supplying it to baseline engine 110 for analysis such that any malicious or anomalous subjects/actors/people/beings amongst people/beings 206 or any anomalous devices at site 202 can be identified. This process depends upon the type of sensor(s) involved. The results of analysis performed by baseline engine 110 and any other related data is stored in an appropriate data storage mechanism for archival and analytics. Such a storage mechanism may be a database on premises at site 202 or in cloud 230 shown in FIG. 2 or a combination thereof.

Let us now study the various embodiments utilizing the different types of sensors at a given site based on the present principles while referring to FIG. 2.

Camera(s): Camera(s) or simply camera 204A visually monitors people 206. In various embodiments, camera 204A may be a standard video camera such as a closed-circuit television (CCTV) camera, or a more specialized camera such as a stereoscopic video camera or a thermal camera. Regardless, camera 204A supplies its data as video packets via network backbone 208 to baseline engine 110 of the above discussion.

Baseline engine 110 then establishes a rolling baseline 120A with conceptual hypercube 180A and centroid 182A for these video packets. It then identifies anomalous video packets as compared to baseline 120A per above-incorporated reference and teachings. Anomalous video packets are associated with a specific subject/person, exemplarily person 206C amongst subjects/person 206 at site 202. Based on the analysis performed by baseline engine 110 and identification of anomalous video packet(s) by engine 110, anomalous subject and device identification system 200 of FIG. 2 identifies person 206C as an anomalous subject or a malicious actor. Its findings can then be accessed directly via an appropriate user interface (not shown) and/or stored in cloud 230 for archival and analytics.

Note that in the present and other embodiments discussed in this disclosure, the correspondence of the reference numeral of the baseline to the type of sensor 204 must not be taken too strictly. For example, any number of baselines may be established by baseline engine 110 based on the video stream from a single camera depending on the analysis performed by the baseline engine for a given implementation. There may be one baseline geared towards security aspects, another baseline geared towards training aspects, another towards behavioral aspects, etc. Conversely, data streams from multiple sensors may be combined into a single baseline also, as per the requirements of a given implementation.

As already mentioned, camera 204A may be a standard video camera such as the one typically integrated with today's cellular phones or smartphones or a more specialized camera or a CCTV camera. The analysis performed by baseline engine 110 for its rolling baseline 120A calculation may then be based on facial recognition and motion tracking of subjects/people/beings 206. Facial recognition and object tracking or simply tracking of people 206 in the video data from camera 204A are performed based on techniques known in the art by data processing module 220 shown in FIG. 2. Preferably, for this purpose data processing module 220 performs form or skeletal motion analysis on the video stream(s).

Data processing module 220 is also responsible for performing any other data preprocessing tasks before supplying its output as data packets to baseline engine 110 for analysis. In various embodiments, data processing module 220 may be implemented as a single module or it may be comprised of various submodules per the needs of an implementation and based on techniques known in the art. In a preferred embodiment, it is implemented as a shim compatibility layer to baseline engine 110.

Each subject or person 206A, 206B, . . . at site 202 is identified by a hash signature or an alternate identifying signature/marker/information or simply an identifier for object tracking performed by data processing module 220. The movement data of each signature is then fed to baseline engine 110. Preferably, the movement data comprises (x, y, z) coordinates or other equivalent location information of the respective individual/subject/being at site 202 at various points in time. Alternately or in addition, the movement data comprises his/her speed and direction of movement at the given location and the given point in time.

As that person moves in a building or site, object tracking function of module 220 tracks the movements of the person in the building having the assigned identifier. If there are more than one cameras 204A, object/facial recognition and tracking is performed on video data streams of all such cameras by module 220. The movement data of tracked people 206 with their respective identifiers is then fed to baseline engine 110 for analysis per above. There are a number of useful scenarios or situations that can be captured by the embodiments. A non-exhaustive list of these includes:

1. Erratic/distressed movement pattern: In one embodiment, rolling baseline 120A signifies the average or mean behavior of crowd 206 by a given set of movements or movement pattern/patterns of people 206 that is considered "normal". An individual or person, such as person 206C with an exemplary hash signature or simply hash or identifier C1369F4789DA, exhibiting an erratic or stressful or distressed movement pattern or patterns may signify an anomaly. In this case, baseline engine 110 will determine the distance of video packets associated with person 206C to be far enough away from centroid 182A of baseline 120A to signal an anomaly. This anomaly is then reported by engine 110 per prior teachings. Anomalous subject and device identification system 200 can then take appropriate actions based on the anomalies reported by baseline engine 110.

2. Audio signatures: In a related variation, camera 204A may be integrated with microphone 204B in a single product/device. In such a variation, audio packets of data or audio data stream from microphone 204B are combined with video packets or video data stream from camera 204A to advantageously enhance facial recognition and object tracking of people 206 at site 202. For example, if site 202 is a theatre or studio or the like where the audio signature of each tracked individual may be distinguishable enough, such an audio signature may further help data processing module 220 to recognize and locate each individual with his/her identifier at site 202. Additional embodiments benefiting from audio or microphone sensors 204B are discussed further below.

As already mentioned, camera 204A may be a stereoscopic camera. Such a stereo camera has the advantage of providing depth information or size information of the object, thus better aiding facial recognition and object tracking of subjects 206 discussed above. In still other variations, camera 204A may be a thermal-video camera, that may or may not also be a stereo camera. Let us study this variation now in greater detail.

Thermal camera(s): In such a variation, a given site 202, such as a building or an arena or a school or any other site shown in FIG. 2, is fitted with one or more thermal cameras 204A. As per above, for brevity, we may refer to thermal camera(s) 204A in the singular with the knowledge that data streams from multiple cameras 204A will be combined by anomalous subject and device identification system 200 for analysis. Camera 204A may just be a pure thermal camera and capture the infrared spectrum of the electromagnetic radiation only. In such an implementation, data processing module 220 recognizes and tracks objects or people 206 based on just their temperature readings or thermal signature alone.

However, in other variations, camera 204A is a bi-spectrum camera because it captures both visible and infrared spectrums of the electromagnetic radiation. Preferably, thermal camera 204A is also a stereoscopic or stereo camera because then it can capture depth/size information. Regardless, thermal camera 204A working in conjunction with data processing module 220, identifies and tracks each individual person amongst persons/people 206 at site 202 and further, reads their body temperatures. Thus, each individual/person along with his/her identifier per above, is also associated with a body temperature reading that is taken in real-time or near real-time. The temperature readings of each tracked/identified person are then provided to baseline engine 110 for analysis.

Figure 3:
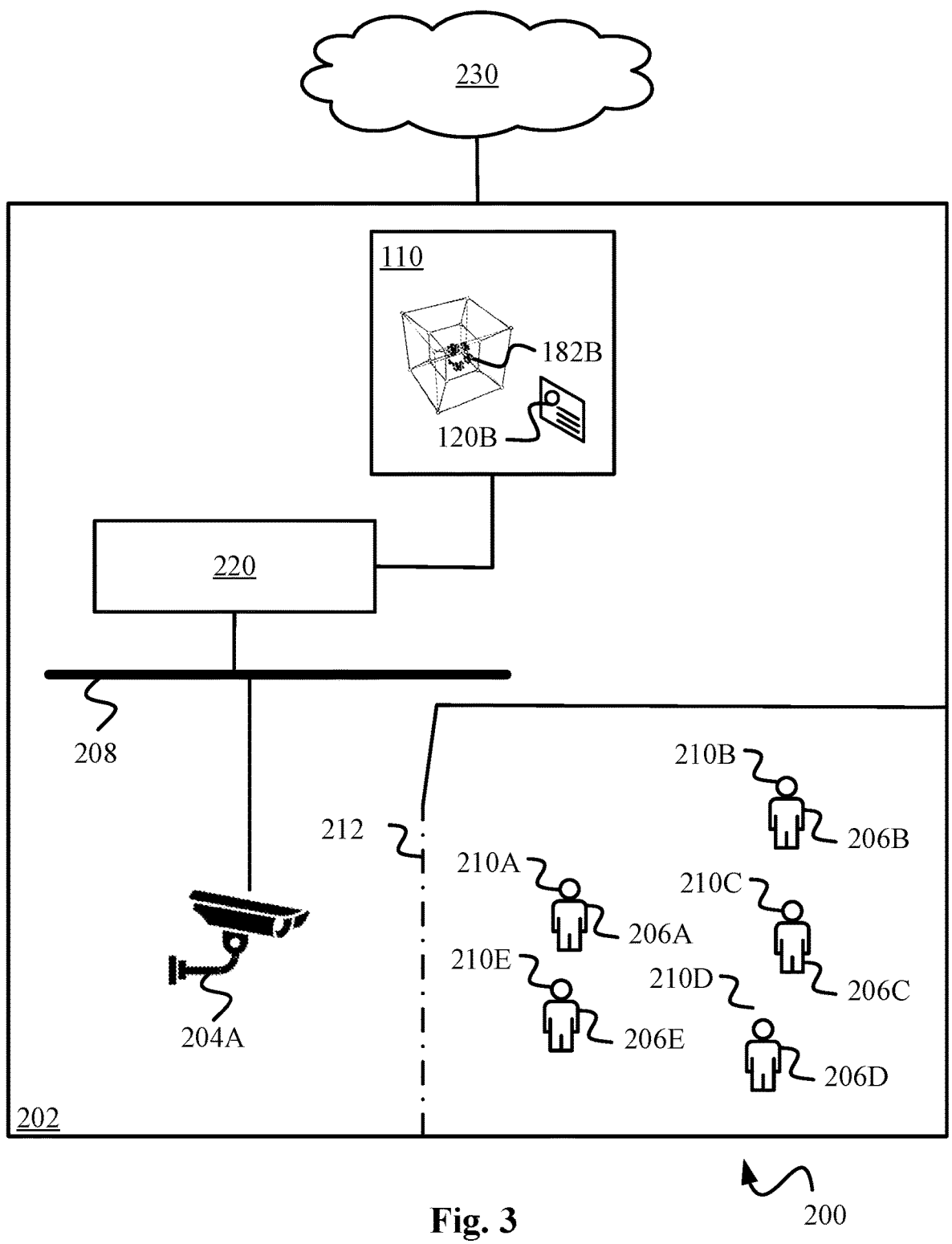
FIG. 3 is a diagram emphasizing the embodiments utilizing one or more cameras according to the instant principles.

Such an embodiment is shown in greater detail in FIG. 3. FIG. 3 is a variation of FIG. 2 showing our site 202 now configured with an entrance 212 denoted by a dotted and dashed line. People 206A, 206B, . . . or simply people 206 are shown entering site/building 202 through entrance 212. People 206 may be a few, or in dozens, or in thousands or even more in number at crowded site 202. There are one or more thermal cameras 204A, which we will simply refer to as camera 204A per above, targeted or aimed at entrance 212. As people 206 enter the building, camera 204A captures their visible and infrared video streams. More specifically, person 206A has a temperature reading of 210A, person 206B has a temperature reading of 210B, and so on as shown.

These visible and infrared video data streams or simply data streams are communicated to data processing module 220 via network backbone 208. Data processing module 220 identifies and tracks each subject 206A, 206B, . . . amongst subjects 206 per above, and associates a temperature reading with them. It then communicates this information to baseline engine 110 for analysis.

Preferably, module 220 communicates data packets containing the following information to engine 110:
1. A timestamp at which the observation is made by camera 204A.
2. An object identifier assigned to each subject/person 206A, 206B, . . . per above.
3. (x, y, z) coordinates or location information of each identified subject/person at site 202.
4. A temperature reading of the identified subject/person at timestamp in (1) above.

These data packets are then parsed by baseline engine 110 which then establishes a baseline 120A for the normal temperature readings for the individuals and identifies anomalous individuals per prior teachings. Preferably, an anomalous threshold value is provided as an input to baseline engine 110. For example, a normal threshold value of 38° C. or 100.4° F. is provided to baseline engine 110 that incorporates this value into baseline 120A with centroid 182A. It then identifies as anomalous any subjects with body temperatures above the normal threshold value.

A number of very useful scenarios are discovered/caught by the present embodiments of the anomalous subject and device identification system of the present design. The present technology allows an early detection of potential health and security threats in a reliable and flexible manner. A non-exhaustive list of useful scenarios identified/caught by the present design includes:

1. Elevated body temperature: Continuing with the above discussion, any individuals, such as person 206C, showing a temperature reading equal to or greater than this normal threshold value are then identified as anomalous by baseline engine 110. If there are multiple thermal cameras 204A, then video data streams from these cameras is processed by combining them at or by data processing module 220 that then tracks objects/people across the various data streams of different cameras and identifies anomalous subjects with elevated body temperatures per above teachings. Preferably, the temperature reading performed by thermal camera(s) 204A is accurate within an error tolerance of less than or equal to 0.3° F.

2. Mask detection and/or enforcing mask wearing: The facial recognition capabilities of module 220 also allow detection of facial masks worn by individuals/personals. Preferably, the facial recognition capabilities are not degraded as a result of subjects wearing masks. Therefore, anomalous subject and device identification system 200 of FIG. 3 is able to detect which subjects amongst subjects 206A-E are wearing facial masks. Baseline engine can then establish baseline 120B based on wearing of masks by the subjects as the normal behavior, and any subjects not wearing a mask can be signaled as an anomaly. Hence, mask wearing can be appropriately enforced upon those individuals/subjects who are not wearing masks.

Furthermore, while an anomalous subject with elevated body temperature per above, signifies a problem/anomaly, but if that individual is also not even wearing a mask, then that is even a greater anomaly or problem or threat, and baseline engine 110 can identify him/her as such.

3. Enforcing social distancing: Based on the capabilities of the present design and specifically the present embodiments, system 200 is able to enforce social distancing amongst subjects, such as that needed during the Covid-19 pandemic. Because the subjects are assigned an identifier and their location, speed and movements are known/tracked, the system can determine which subjects are not following social distancing guidelines. In the present case, proximity to other subjects may be a dimension on the hypercube of the respective baseline established by engine 110. A proximal distance, for example 6 feet, can be provided as an input to baseline engine 110 representing the minimum threshold value. If a given subject is in repeated violation of the minimum threshold value/distance, then this situation and the subject can be conveniently identified and flagged by baseline engine 110.

4. Weapons detection: Depending on the image/object recognition capabilities of data processing module 220, data streams captured by cameras 204A can be used to determine if a subject is carrying a weapon at site 202. Of course, the present technology can support additional specialized sensors for weapons detection, such as metal or ballistic detectors at the site, instead of or in addition to sensors 204 shown in FIG. 2. Such sensors allow system 200 to specifically detect guns, knives and other prohibited articles. As a result, system 200 in conjunction with baseline engine 110 can identify any anomalous individuals that may be carrying a prohibited weapon at site 202 per prior teachings.

5. Thermal signatures: The above capabilities utilizing thermal cameras of the present technology also allow system 200 to harvest thermal signatures of subjects at site 202. For instance, each subject may have a slightly different normal body temperature that can be captured and cataloged by the system in an appropriate database. Similarly, an overall infrared signature of the bodies or forms of each subject may also be captured and cataloged in the database.

Microphone(s): While referring back to FIG. 2, a given site 202, such as a building or an arena or any other location, is fitted with one or more microphones 204B. As per above, for brevity, we may refer to microphones 204B in the singular with the knowledge that data streams from multiple microphones will be processed by anomalous subject and device identification system 200 for analysis per above.

While typically microphones will come integrated with cameras 204A, this is not necessarily the case. It is conceivable to have a site where audio signatures of subjects alone are used for identification and tracking and for determination of anomalous subjects. Examples of such audio sensitive sites include theaters, studios, etc. Moreover, the audio signatures may be combined with video signatures for better tracking of objects.

Data processing module 220 of FIG. 2 may correlate an audio signature or identifier of a subject amongst subjects 206 based on audio stream from microphone 204B, with a video signature or identifier of the subject based on video stream from camera 204A to pinpoint the location of the subject with greater fidelity. It can then better provide the movement patterns or temperature readings of these subjects to baseline engine 110 for analysis per above teachings.

Asset sensor(s): While still referring to FIG. 2, a given site 202, such as a manufacturing or a chip fabrication facility or any other location containing important or valuable assets, is fitted with one or more asset sensors 204C. For the purposes of present discussion an asset is a subject that is not a sentient being but still a valuable and/or sensitive item or thing whose monitoring is required. Examples include manufacturing equipment, apparatus, vaults/safes, valuable paraphernalia, or any other item of value at site 202 whose monitoring is justified. As per above, for brevity, we may refer to asset sensors 204C in the singular with the knowledge that data streams from multiple asset sensors will be processed by anomalous subject and device identification system 200 for analysis per above.

Asset sensor 204C captures data from one or more xmitters installed in or near or around assets present at the site. In the embodiments where site 202 is a manufacturing or chip fabrication facility, an xmitter can be any sensor installed in or near a manufacturing equipment or asset that senses/monitors the asset and transmits the sensed/monitored data to asset sensor 204C. An xmitter at a manufacturing or any other site can be based on any suitable wired or wireless technology including blue-tooth, cellular network, radio frequency identification (RFID), Zigbee, etc.

Exemplarily, such an xmitter monitors the asset to ensure that it stays at a given location. Alternatively or in addition, such an xmitter may perform measurements of one or more manufacturing parameters for and/or in conjunction with the asset/equipment/tool, such as, reading the value of a voltage, a current, a pH, etc. It then transmits this reading or sensed data, either by a wired connection or wirelessly to an asset sensor of the present design, such as asset sensor 204C.

Figure 4:
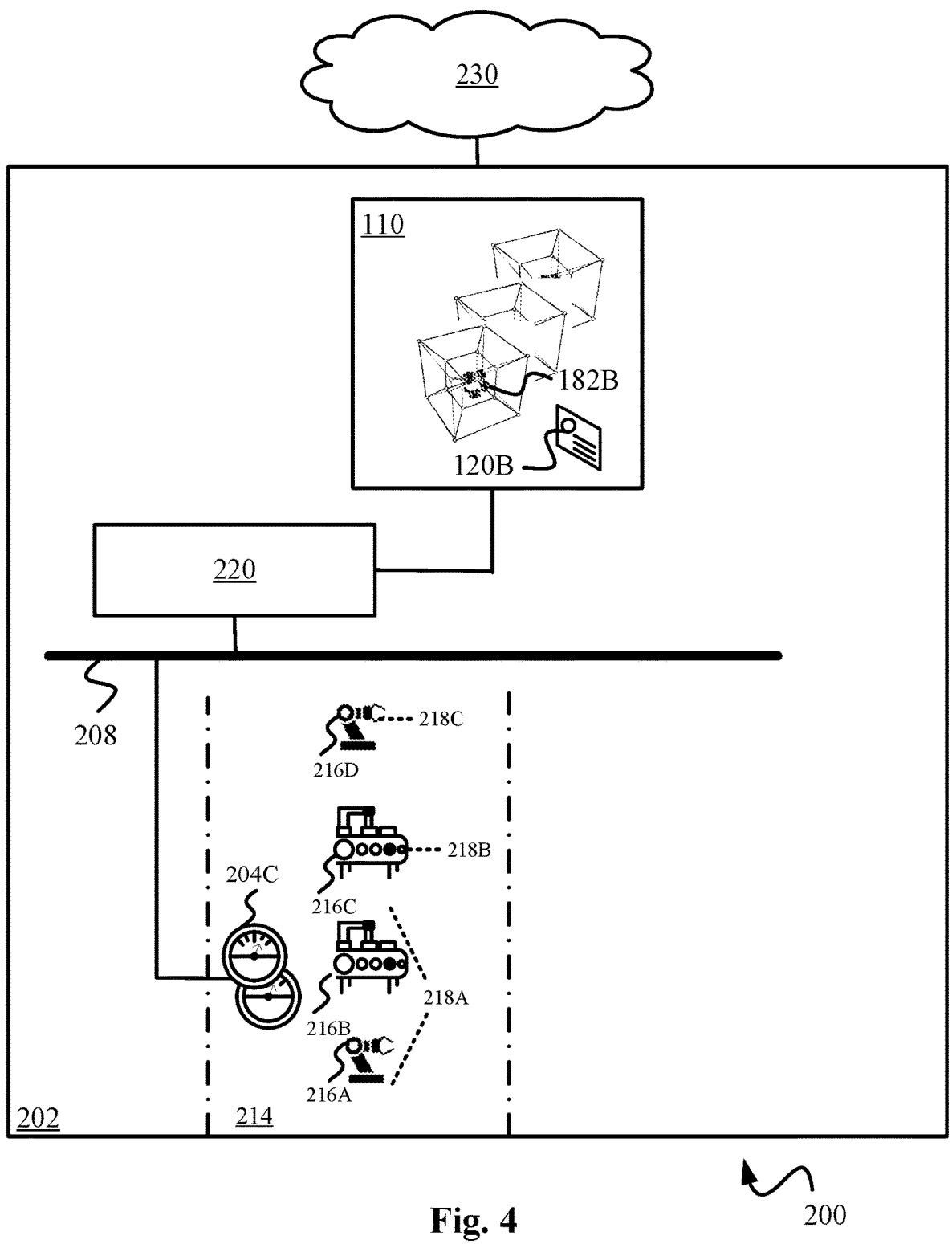
FIG. 4 is a diagram emphasizing the embodiments utilizing one or more assets sensors and xmitters at a manufacturing or fabrication site according to the instant principles.

FIG. 4 shows such an embodiment in greater detail. More specifically, FIG. 4 is a variation of FIG. 2 where site 202 is a manufacturing facility, for example, a chip fabrication facility or fab. Facility 202 has a manufacturing line 214 that has various manufacturing assets or tools 216A, 216B, 216C and 216D as shown. These assets are being monitored by various xmitters of the present principles. Specifically, xmitter 218A is in charge of monitoring asset/equipment 216A and 216B, xmitter 218B is monitoring asset 216C and xmitter 218C is monitoring asset/equipment 216D.

Data surveilled or monitored by xmitters 218A-C is then transmitted, by wire or wirelessly, on-demand or at regular intervals or on realtime or near-realtime basis, to asset sensor(s) 204C. Asset sensor 204C may be any wireless sensor receiving data packets from xmitters 218A-C based on techniques known in the art. For instance, asset sensor(s) 204C may communicate with xmitters 218A-C using one or more of blue-tooth, cellular network, radio frequency identification (RFID), a Zigbee or any other suitable wireless technologies required for a given implementation.

Asset sensor 204C then communicates this data to data processing module 220 as shown. In the present embodiment, data processing module 220 performs any necessary processing of data received from xmitters 218A-C before providing it to baseline engine 110 for analysis. In an exemplary embodiment, data processing module 220 normalizes data between one or more assets. In the same or another variation, module 220 correlates data between assets of the same type or of different types. In any event, the processed data is provided to baseline engine 110 for analysis. Baseline engine now establishes a rolling baseline for assets 216A-D based on data received from xmitters 218A-C and identifies any assets or subjects that may be anomalous.

In the preferred embodiment, baseline engine 110 establishes a rolling baseline for each different type of asset or manufacturing tool/equipment. For example, if site 202 is a fab then baseline engine 110 may establish a rolling baseline 120B with centroid 182B for chemical vapor deposition tools, and another baseline for metrology tools, etc. as shown. Note that in FIG. 4, to avoid clutter, only one such baseline with its centroid are shown marked by reference numerals 120B and 182B respectively.

Figure 5:
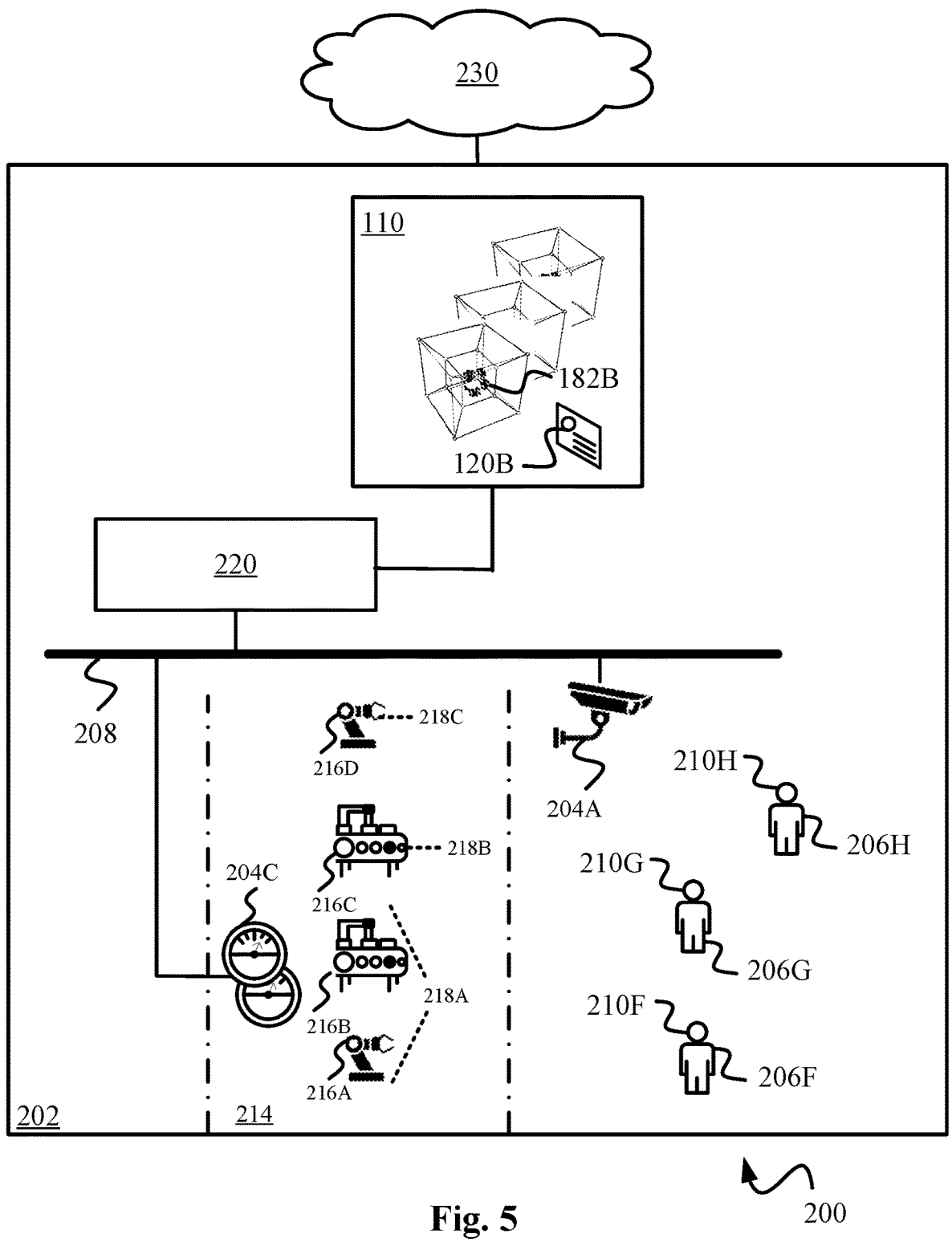
FIG. 5 is a variation of FIG. 4 also incorporating cameras and other subjects.

FIG. 5 shows a variation of FIG. 4 containing a camera(s) 204A from the embodiments of FIG. 3 explained earlier. Also shown are human subjects 206F, 206G and 206H. Camera 204A is in charge of monitoring/surveilling people 206F-H present at site 202 per earlier explanation. There is also a data processing module 220 in FIG. 5 of above discussion. In the present embodiments, in addition to its functions already described above, data processing module 220 also correlates data between human subjects 206F-H and manufacturing subjects or assets 216A-D. If camera or cameras 204A are also thermal cameras, then temperature readings 210F-H of subjects 206F-H respectively are also available as shown.

There are a number of useful scenarios that are identifiable by the variations shown in FIG. 4 and FIG. 5. A non-exhaustive list of these scenarios includes:

1. Dwell times: Examples of useful correlations between data from asset sensor(s) 204C and camera(s) 204A include which human subjects 206F-H have been in the vicinity or proximity of manufacturing subjects/assets 216A-D during a given time window, the dwell times of subjects 206F-H around subjects 216A-D in a given time window, the temperature readings of these subjects, where else in facility 202 have subjects 206F-H been, their past security profile/performance, etc. This correlated data is then provided to baseline engine 110 which analyzes it and identifies anomalous subjects or assets at site 202 per prior explanation.
2. Training or other security issues/threats: If a subject/human 206B has shown a greater than normal dwell time around a malfunctioning asset 216D, then this may signify a training problem. If asset 216D has been involved in security incidents in the past, then this may signal a security issue or threat associated with subject/human 206B.
3. Espionage: If an unauthorized universal serial bus (USB) device with malware is inserted into subject/asset 216C that is exfiltrating data, then baseline engine 110 will catch this incident. More specifically, data transmission/download patterns of subject/asset 216C as compared to its baseline will signify a greater than "normal" activity. Such an anomalous activity will be identified based on the distance of the number of transmitted/downloaded data packets from the centroid of the hypercube of the baseline per prior teachings. This is one form of espionage that is identifiable by the present technology.

As another example, if an unauthorized subject/human has excessive dwell time around a sensitive asset, then this might signify another form of espionage.

Similarly, a variety of other useful scenarios that are based on correlating data related to subjects 206F-H and captured by camera(s) 204A with the data related to subjects 216A-D captured by asset sensor(s) 204C, are conceivably caught and are identifiable by the embodiments explained in relation to FIG. 4-5.

Personal-device sensor(s): In a highly preferred set of embodiments, a given site 202 of FIG. 2, such as a building or an arena or any other site, is fitted with one or more personal-device sensor(s) 204D. Personal-device sensors 204D are wireless sensors based on one or more of a blue-tooth sensor, a cellular signal sensor, a radio frequency identification (RFID) sensor/reader, a Zigbee sensor or any other suitable wireless technology sensor required for a given implementation. Personal-device sensors 204D are in charge of communicating with the devices carried by various subjects at site 202.

If a personal-device sensor is a blue-tooth sensor, it is responsible for communicating with blue-tooth personal-devices, if it is a cellular signal sensor, it is responsible for communicating with cellular personal-devices such as cellular phones, if it is an RFID reader, it is responsible for communicating with RFID personal devices such as RFID tags, which may be active, passive or semi-active tags. If the personal device sensor is a Zigbee sensor, it is responsible for communicating with Zigbee personal-devices such a Zigbee end-devices.

Depending on the requirements of an implementation and the capabilities of a particular wireless technology, any of the communication above may be bi-directional or uni-directional i.e. only from the personal-devices to the personal-device sensor. Moreover, more than one sensors of the same or different type may be integrated into a single composite sensor/device in the present or any other embodiments of this disclosure.

A personal-device carried by a subject may or may not actually be owned by him/her or be his/her "personal" device in a manner of ownership. However, for the purposes of this disclosure any device carried by the subject is termed as a personal-device. Such subjects are typically human beings and the devices carried by them may be cellular phones including smartphones, tablets, wearable devices such as smartwatches, laptop computers, etc. Note however that there are situations that a personal-device is unattended or not carried by any subject. Such a situation is discussed in detail in the embodiments explained below.

Figure 6:
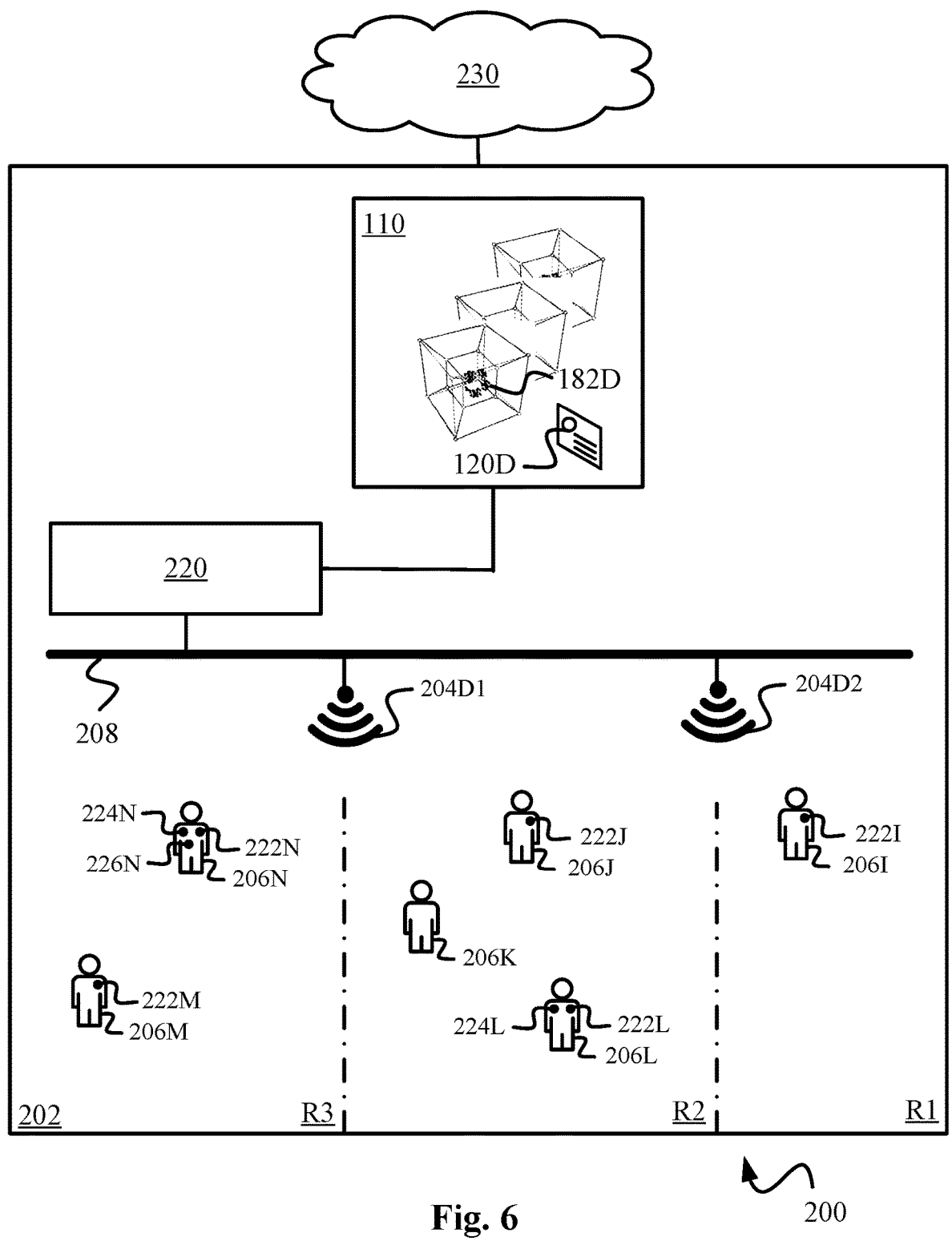
FIG. 6 is a diagram emphasizing the embodiments utilizing personal-device sensors at a site.

FIG. 6 shows the present embodiments in greater detail. Specifically, FIG. 6 is a variation of FIG. 2 emphasizing the wireless sensor capabilities based on the instant principles. Site 202 of FIG. 6 shows a number of human subjects carrying devices. Specifically, FIG. 6 shows subject 206I carrying a device 222I, 206J carrying a device 222J, 206L carrying devices 222L and 224L, 206M carrying device 222M and subject 206N carrying devices 222N, 224N and 226N at site 202. Note that subject 206K is not carrying any device while subject 206L is carrying two devices 222L and 224L, and subject 206N is carrying three devices 222N, 224N and 226N. While the present design supports only having one personal-device sensor, the embodiment of FIG. 6 explicitly shows two personal-device or wireless sensors 204D1 and 204D2 which may be based on any number of available wireless technologies, some examples of which were listed above.

Now, based on triangulation and trilateration techniques known in the art and the availability of sufficient number of sensors 204D, the present design is able to determine where each device carrying subject is on the premises of site 202. For this purpose, our data processing module 220 may again be utilized with the necessary algorithms for locating devices 222, 224 and 226 with their respective subjects 206 at site 202. As noted, two such exemplary algorithmic techniques include triangulation and trilateration.

As a consequence, module 220 may determine that individual/subject 206I is in region R1 of site 202, individuals/subjects 206J and 206L are in region R2 and subjects 206M and 206N are in region R3. Furthermore, data processing module 220 of the present design also assigns an identifier to each device that it detects at site 202. Note that subject 206K who is not carrying any device will not be detected by sensors 204D1 and 204D2 alone. For this purpose, we will defer to embodiments discussed further below.

Now, given the above setup, the wireless embodiments of FIG. 6 are able to provide a number of important capabilities for identifying anomalous situations. A non-exhaustive list of such capabilities and situations/scenarios is provided below:

1. Location detection: As noted above, with two or more personal-device sensors 204D1-2, the system is able to determine the location of each device carrying subject at site 202 using techniques including triangulation and trilateration.
2. Anomalous movement patterns: Based on location detection, the system is further able to determine movement patterns or speed and direction at a given point in time of subjects 206I, 206J, 206L, 206M, 206N. If any subjects exhibit erratic or distressed movements, they can be identified by baseline engine 110 per above teachings.
3. Anomalous dwell patterns: In a similar manner, system 200 is able to identify different from normal dwell times of any subjects 206I, 206J, 206L, 206M, 206N at sensitive locations at site 202 based on their authorization level. Similarly, the proximity of one subject to other subjects that is not regarded normal for a given implementation, etc. can also be identified and an anomalous subject identified per above.
4. Excessive beaconing in unused media access control (MAC) address space: Let us consider the scenario where site 202 of FIG. 6 is an office building with a local area network (LAN) powered by one or more personal-device or wireless sensors or antennas 204D1-2 and subjects 206I-N are expected to be employees. Prior to joining the LAN, a device beacons in an unused MAC address space, that is, by not using its real or correct MAC address. However, this beaconing is still detected by sensors 204D1-2 and data processing module 220 assigns it an identifier.

Only after a device joins the LAN, it beacons with its correct MAC address and at which point system 200 can use its real MAC address as the device identifier. If it is expected that employees 206I-N will be connected to the LAN, then a device that continues to beacon in the unused MAC address space for a greater than normal period of time, will be identified as a suspect device by baseline engine 110.

More specifically, baseline engine 110 will establish rolling baseline 120D with a normal behavior of data streams from sensors 204D1-2 indicating that devices at site 202 start communicating with their real MAC address within a "normal" time window. This time will be a dimension in the conceptual hypercube with centroid 182D of baseline 120D. If a device such as device 222J carried by employee 206J beacons in the unused MAC address space for greater than normal time, then it will be far away enough from centroid 182D along this dimension to signify an anomaly. Such an anomaly may indicate a breach or security incident or a threat, or a technical issue. As a result, employee 206J with device 222J will be flagged/signaled as an anomaly by engine 110. These and other useful scenarios are easily identifiable and caught by anomalous subject and device identification system 200 of the personal-device sensor embodiment shown in FIG. 6.

Figure 7:
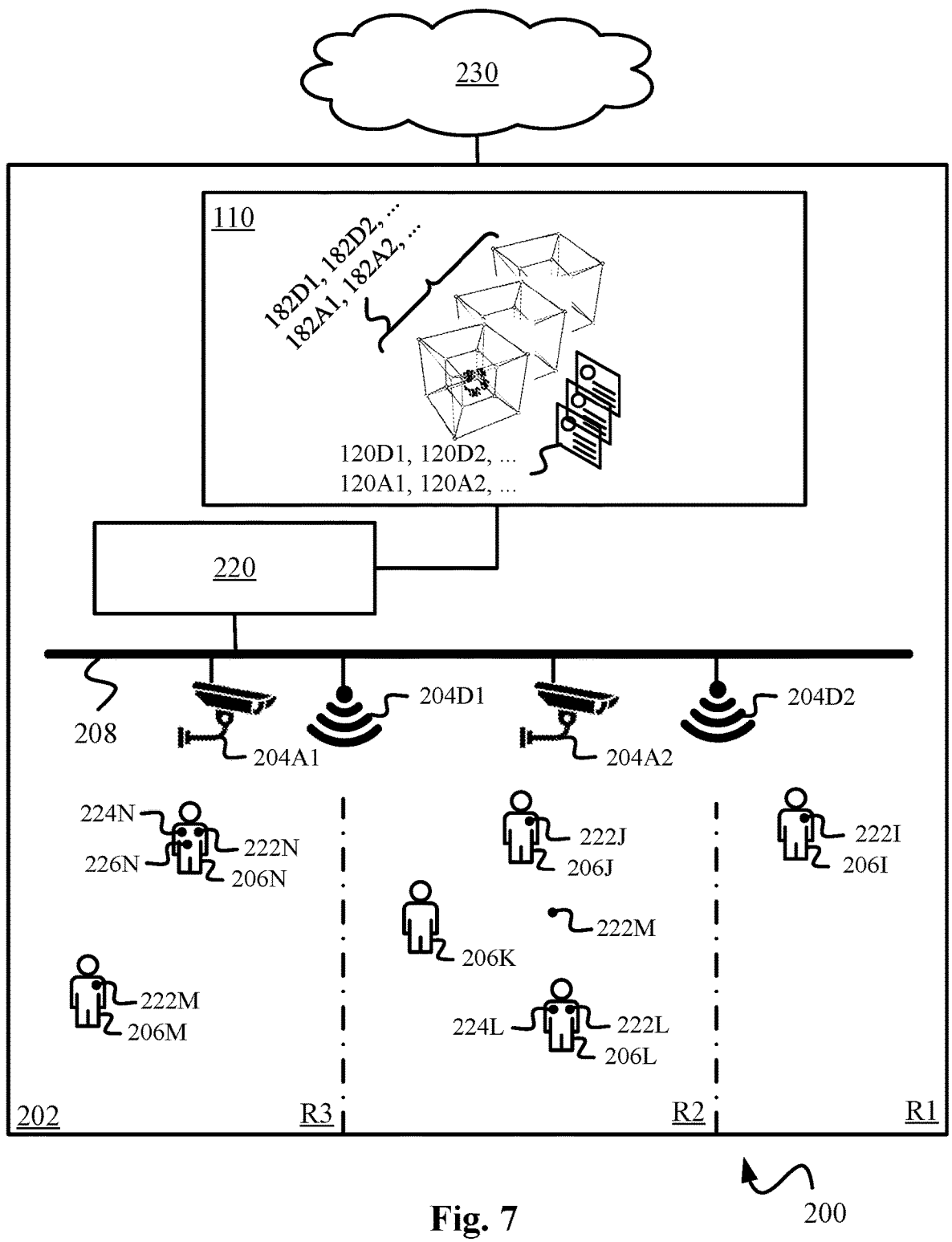
FIG. 7 is a variation of FIG. 6 also incorporating cameras and unattended devices at the site.

Personal-device sensor(s) together with camera(s): In a highly useful set of embodiments personal-device sensors 204D of FIG. 2 and FIG. 6 work together with cameras 204A of FIG. 2 to provide additional fidelity to our anomalous subject and device identification system. Such an embodiment is shown in FIG. 7. Just like the embodiments of FIG. 5, cameras for the present embodiments are a desirable but not necessary type of sensor to accrue the benefits of the present technology.

FIG. 7 is a variation of FIG. 6 but also with cameras 204A of the prior teachings. FIG. 7 also shows a device 222M in region R2 of site 202 that is not carried by any subject. In the example of FIG. 6, two cameras 204A1 and 204A2 are explicitly shown as well as data processing module 220 that amongst other things, performs object tracking and facial/image/object recognition. In a manner analogous to the embodiments of FIG. 5, cameras in FIG. 7 add fidelity to the embodiments of FIG. 6 while also providing additional capabilities as discussed further below. For example, cameras 204A1 and 204A2 of FIG. 7 are able to detect and track subject 206K who is not carrying any wireless device detectable by personal-device sensors 204D. Of course, camera(s) 204A1-2 are able to afford all the capabilities to the embodiment of FIG. 7 as already explained in reference to the embodiments of FIG. 3.

Moreover and very importantly, system 200 with cameras 204A1-2 working in conjunction with data processing module 220 as well as personal-device sensors 204D1-2 is now able to associate a specific subject with each device. Anomalous subject and device identification system 200 of FIG. 7 assigns an identifier to each subject as well his/her associated device(s) per above. As the subject moves around the building/site 202, the system is able to ascertain the physical proximity or correlation between the subject and his/her devices.

Data streams from sensors 204A1-2 and 204D1-2 processed by module 220 are then provided to baseline engine 110. Based on data streams from cameras 204A1-2, baseline engine establishes one or more baselines 120A1, 120A2, 120A3, . . . 120AN for the dimensions of conceptual hypercube of interest with correspondent centroids 182A1, 182A2, 182A3, . . . 182AN. Similarly, based on data streams from wireless sensors 204D1-2, baseline engine establishes one or more baselines 120D1, 120D2, 120D3, . . . 120DN for the dimensions of conceptual hypercube of interest with correspondent centroids 182D1, 182D2, 182D3, . . . 182DN. It then scores each incoming packet from these data streams against the above baselines by computing the distance of the packet from the respective centroids on a certain dimension of interest. If the distance is far enough or greater than what is normal for the respective baseline, it identifies that packet as an anomalous packet and signals an anomaly identifying the associated subject and/or device per prior teachings.

Such a capability allows a number of important scenarios to be discovered/caught by anomalous subject and device identification system 200 of FIG. 7 based on the present technology. A non-exhaustive list of these include:

1. Lack of a device carried by a subject: A subject, such as subject 206K detected and tracked by cameras 204A who is not carrying any device may indicate a suspect situation for site 202. In this case, one dimension of the conceptual hypercube will exemplarily be the number of devices carried by a subject. If the number is 0 or too high above the normal, then this indicates an anomaly for site 202. Such a scenario along with the anomalous subject is identified by the present technology per above teachings.
2. Unattended device: Device 222M that is not carried by any subject may also be a suspect situation. Such a device 222M can be detected by one or more of various types of appropriate sensors supported by the present design, including cameras 204A1-2 and personal-device sensors 204D1-2 of FIG. 7. Device 222M will have an assigned identifier by data processing module 220 per above. If there has been no subject associated with this device identifier, then the device itself and alone is identified by the system as an anomalous device. On the other hand, if the device identifier has been associated with subject 206M with his/her own identifier, then system 200 is able to ascertain that subject/human 206M was previously associated with or carrying device 222M. Subject 206M may or may not be on site 202 at that point in time.

Any of the above scenarios may simply signify an innocuous situation, such as a lost device. On the other hand, these may also indicate a more serious security incident/threat associated with device 222M and subject 206M. Regardless, the above scenarios along with the subject and/or device in question are signaled by baseline engine 110 as anomalies and identified.

More specifically, in these scenarios, one dimension of the conceptual hypercube will exemplarily be the number of subjects associated with a device. If the number is 0 or greater than 1, then this indicates an anomaly for site 202. Per above, if there is a prior association of an anomalous device with a subject then that subject is also identified, otherwise just the device itself is identified as anomalous by the anomalous subject and device identification system 200 of the present design.

3. Transfer of a device: In an analogous manner, if a device that was once associated with one subject is now associated with another subject, such a situation also rises to a level of concern or anomaly. Again, such an anomaly caught by the present design may be innocuous or a more serious security exposure or threat. In this case also, one dimension of the conceptual hypercube will be the number of subjects associated with a device. If the number is 0 or greater than 1, then this indicates an anomaly for site 202.

Wireless sensors with site instrumentation: In addition to or alternatively of cameras, in some embodiments the wireless sensors of the present design are augmented by wireless antennas instrumented/installed at the site. Like cameras, these local antennas and instrumentation provide additional fidelity to the anomalous subject and device identification system of the present design.

Figure 8:
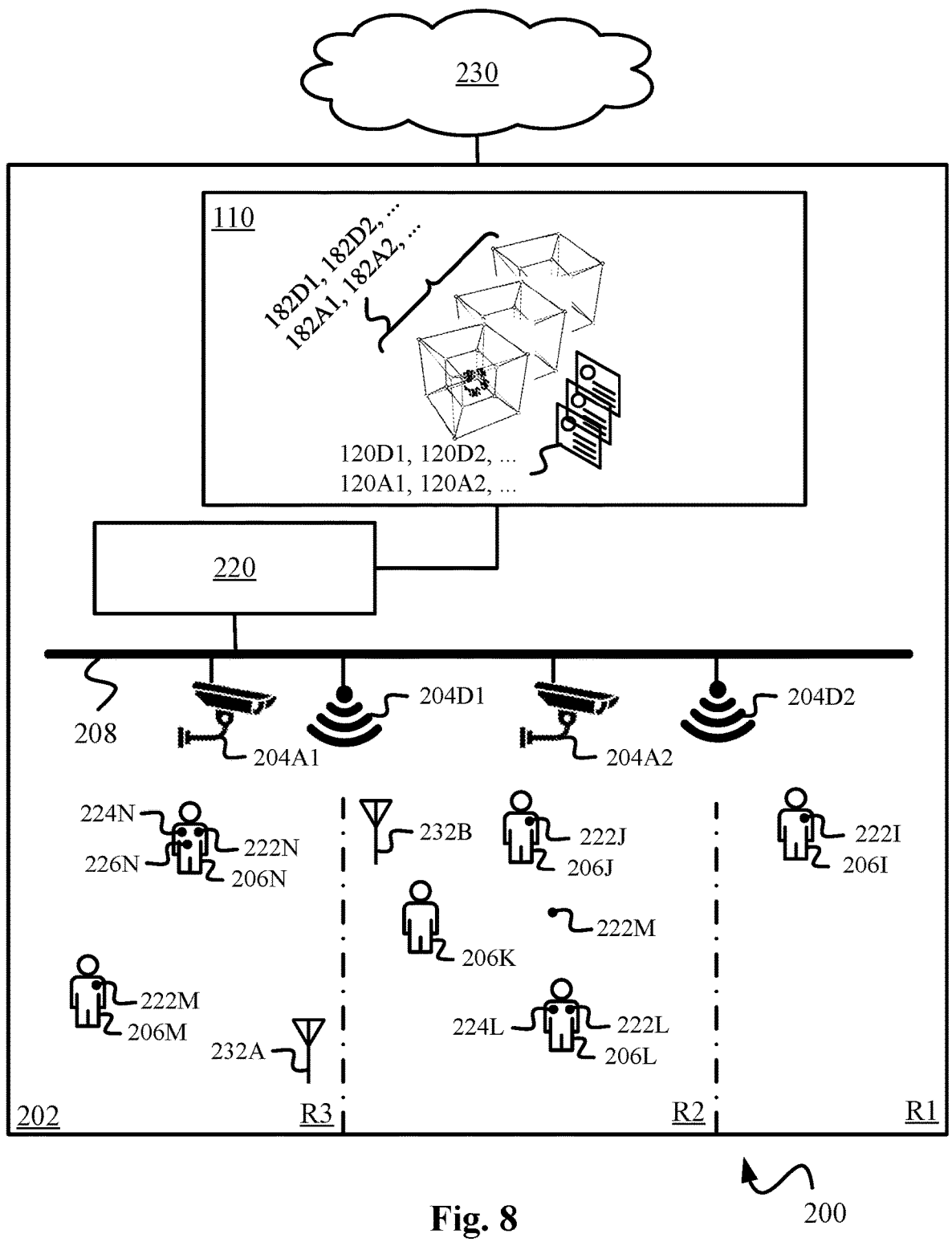
FIG. 8 is a variation of FIG. 7 also incorporating wireless antennas installed at the site.

FIG. 8 assists us in explaining these embodiments in greater detail. FIG. 8 is a variation of FIG. 7 but with an RF infrastructure containing two additional radio antennas 232A and 232B installed in regions R2 and R3 of site 202. Preferably, these antennas are wifi antennas or access points operating in a radio frequency range of 2.5 to 5 GHz. Preferably still, the antennas are cellular antennas. Such antennas may be used in conjunction with a spectrum analyzer (not shown specifically) in order to read and analyze the cellular signals from the devices. Based on the signal strength and/or other network techniques in the art, these antennas assist in knowing whether a device is close to an antenna or not. This knowledge further supplements the object tracking by data processing module 220 enabled by cameras 204A.

Any number of antennas 232A, 232B or more, installed in the local infrastructure at site 202 can operate in one or more of at least two configurations: (i) the antennas act as a booster for wireless sensors 204D1-2 by collecting data on the ground close to the devices at site 202 and then communicating it to sensors 204D1-2 either by wire or wirelessly, (ii) the antennas themselves operate as sensors 204D installed at optimal locations at site 202 for maximum signal coverage/strength. In other words, they may supplement existing wireless sensors 204D, but instead of or in addition to, may also act themselves as wireless sensors 204D.

In the absence of cameras 204A, antennas 232A and 232B assist in the determination of the location of a device with respect to the antennas in conjunction with wireless sensors 204D. As explained earlier in reference to the embodiments of FIG. 6-7, this is accomplished by using network algorithmic techniques including triangulation and trilateration, etc. preferably performed by data processing module 220. Any number and type of such antennas based on various available wireless technologies may be installed at site 202 depending on the requirements of an implementation. The various antennas at the site may all be based on the same or different wireless technologies depending on the types of wireless devices they need to communicate with.

Using sensors on computing devices: In a highly useful set of embodiments, sensors available on computing devices are used to accrue the benefits of the anomalous subject and device identification system of the present design. The benefit of these embodiments is that instead of requiring separate sensors, sensors that are already ubiquitously present in today's computing devices are utilized. Exemplary computing devices include laptops, tablets, cellular phones including smartphones, wearable devices (including smartwatches and medical devices), security devices, etc.

Figure 9:
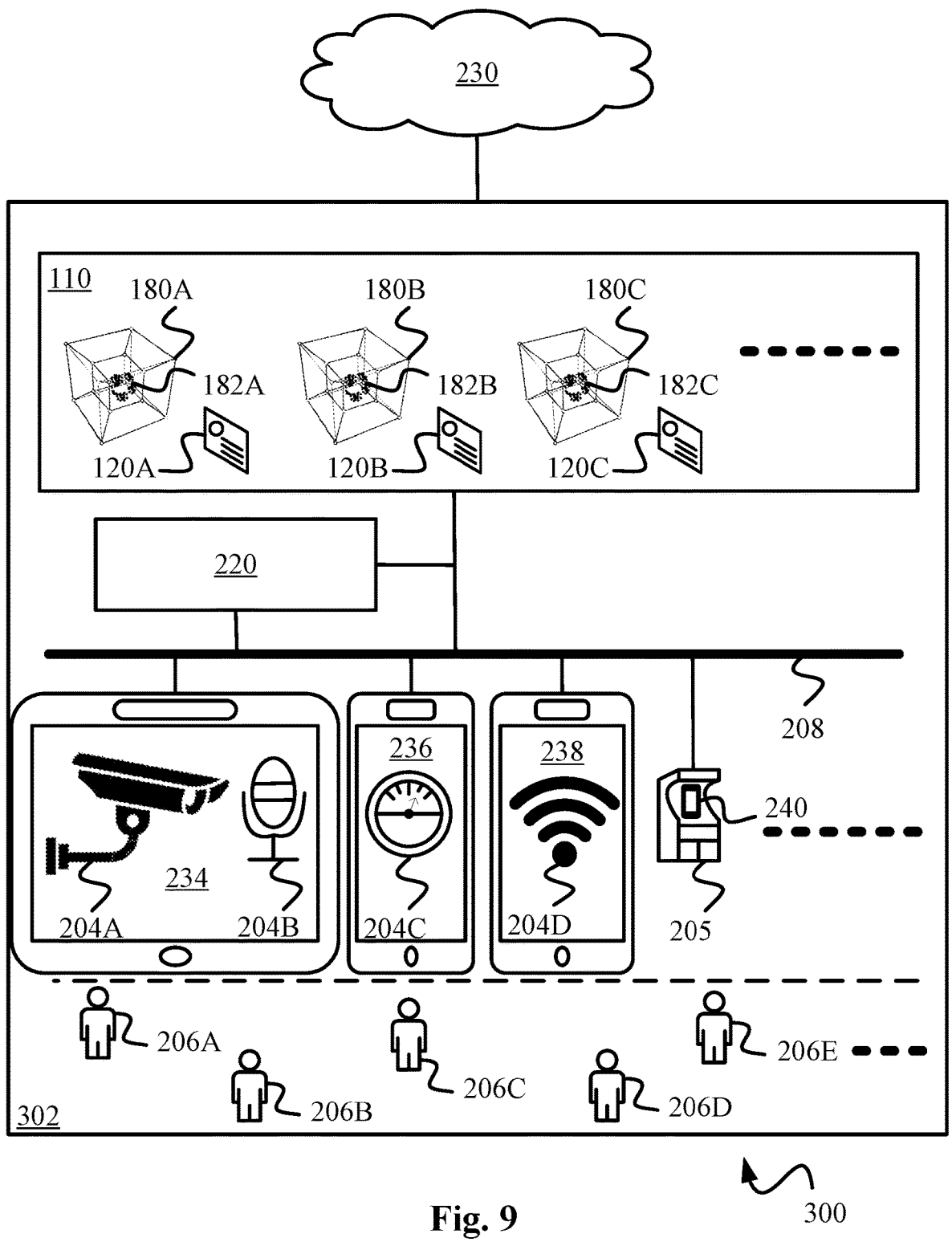
FIG. 9 is a diagram emphasizing embodiments where sensors of the present design are embodied in various computing devices.

Let us take advantage of FIG. 9 to discuss these embodiments in greater detail. FIG. 9 is a variation of FIG. 2 showing an anomalous subject and device identification system 300 of the present design operating at a site 302. Camera and microphone sensors 204A and 204B respectively of the prior discussion are now embodied in a tablet 234, wireless asset sensor 204C is now embodied in cellular phone or smartphone 236 and wireless personal-device sensor 204D is now embodied in cellular phone or smartphone 238. By being embodied here we mean that the sensor in question may be integrated with the device or operably connected to it, such as via a USB port.

Kiosk 205 discussed further below has a computing device 240 installed in it. Device 240 may be a tablet or a cellular phone/smartphone or even a laptop or the like. Not all of sensors 204A-D above need to be embodied in computing devices. In other words, any subset of the sensors may be separately installed as in the embodiments of FIG. 2-8. Also shown in FIG. 9 is data processing module 220 that works in conjunction with the sensors per prior discussion.

All the relevant teachings of the prior embodiments apply to the present embodiments also, except that the sensors are now on economically and ubiquitously available on (personal) computing devices. One of the advantages of the present embodiments is that a given site, such as site 302 can be quickly provisioned with the instant anomalous subject and device identification system 300. This is because the computing devices housing the sensors of interest, such as devices 234, 236, 238 and 240 are cheaply and readily available. Moreover, they have a small form factor, such that they can be easily and flexibly deployed at site 302 for optimal results. In an interesting application of the present embodiments, mobile devices with police officers containing cameras, microphones and/or other sensors are used to surveil a location on a short notice per above teachings.

Kiosks: Referring to FIG. 2, the present technology lends itself well to showcasing its capabilities at a kiosk 205 at site 202. Kiosk 205 may be instrumented with one or more sensors 204. These sensors may further be embodied in a computing device installed or operating in the kiosk.

Referring now to the embodiment of FIG. 9, kiosk 205 shows a computing device 240 that may be a tablet operating in it. Exemplarily, tablet 240 may be instrumented with a camera, such as camera 204A and a microphone, such as microphone 204C along with a data processing module 220 of the present design. Then, guests/subjects 206 at site 306 may use the kiosk to take their temperature reading or to ensure that their mask is detectable or to get familiarized with the capabilities of anomalous subject detection system 300 at site 302.

Data layering: In the preferred embodiment, the present technology is implemented by storing the data streams from various sensors, such as sensors 204 at site 202/302 as separate data-tracks or layers in a file. Each data layer or track in the data file corresponds to a data stream from a sensor. For example, there may be a radio frequency (RF) data layer, a cellular layer, a blue-tooth layer, a video layer, an audio layer, etc. This layering may be performed by data processing module 220.

Additionally, as object recognition is performed, an underlying subject/device data layer containing characteristics of the objects being recognized and to whom an identifier is assigned per above, is also created. For instance, if the object recognition function recognizes two persons amongst persons 206 with identifiers 78X67 and Y6790 with heights 6 foot, 3 inches and 5 feet, 6 inches respectively, then this data is stored in the underlying subject/device data layer in the data file.

Where there are multiple sensors of the same type, such as cameras 204A1 and 204A2 in FIG. 7-8, the data streams from these sensors can be stored as separate data layers. Alternatively, the data streams may first be combined into a composite data layer of video type by data processing module 220 and then stored in the data file. The present design thus affords the above multilayer approach to data streams obtained from various sensors.

Forensic analysis: As already mentioned, the embodiments of FIG. 2-9 utilize cloud 230 for archiving the findings of baseline engine 110 and for performing analytics on the archived data. Such analytics or forensic analysis, that preferably utilizes machine learning (ML) and artificial intelligence (AI) techniques, can be extremely useful. This is because it can allow answering hard questions for establishments and allow them to limit liability and/or manage risk.

For example, let us consider that a site, such as site 202/302 of the of the prior discussion is a restaurant/school. Then a claim by a patron/student 206 that he/she got infected with Covid-19 virus while at the restaurant/school on a given date may be challenged by uncovering evidence in the archive that the patron/student was not wearing a mask on that date at the restaurant/school. In another interesting application of the above embodiments for performing mask wearing enforcement/detection, a local government may audit a chain of hotels or restaurant based on the above-discussed instant archived data in cloud 230 to determine if they have been allowing patrons without masks.

Furthermore, as the data streams from sensors 204 about subjects at site 202/302 is stored in a database, whether the database is on-premise at site 202/302 or in cloud 230, this allows the creation of profiles for individual subjects. This capability is also very useful because any analytics performed on the output of baseline engine 110 can then be matched against the profile of the subject in question to determine whether a specific behavior matches his/her profile. If it does not, then system 200/300 updates the subject or target profile accordingly. The profiling capability further allows system 200/300 to blacklist or whitelist subjects as needed.

In yet another variation, the anomalous subject and device identification system of the present design further analyzes data from subjects based on their police record. For example, one dimension of the hypercube of the baseline established by baseline engine 110 may be the number of arrests or warrant or charges, etc. for the subjects. This information may then be utilized to determine if a given subject scored on that dimension is likely to be associated with an anomalous situation based on above teachings.

Overall: Any of the embodiments taught above may utilize a wired or a wireless connection as appropriate to facilitate communication between sensors, devices and ground infrastructure. Furthermore, backbone 208 discussed in various embodiments above may also be wired or wireless. Furthermore, various capabilities of the above embodiments may be combined (mixed and matched) depending on the number and types of various sensors and/or devices involved in an implementation.

Furthermore, exemplary sites/locations that may benefit from the anomalous subject and device identification system with its above-taught embodiments include airports, train stations, subways, central bus stations, embassies and consulates, government buildings, stadiums, arenas, venues, convention centers, Fortune 500 companies' headquarters or key offices, hospitals, universities/colleges, schools, restaurants and hospitality centers, office buildings, etc.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A system comprising computer-readable instructions stored in non-transitory storage media and at least one microprocessor coupled to said non-transitory storage media for executing said computer-readable instructions, said at least one microprocessor configured to:
   (a) analyze data obtained from one or more sensors, said data related to one or more subjects at a site;
   (b) establish a rolling baseline for said data by assigning each packet of said data to a cluster of packets amongst a plurality of clusters of packets of said data;
   (c) score, based on its distance from a centroid of said rolling baseline, each packet of said data; and
   (d) identify based on said distance an anomalous subject amongst said one or more subjects;
   wherein said one or more sensors comprise one or more of a video sensor, an audio sensor, a cellular network sensor, a blue-tooth sensor, a radio frequency identification (RFID) sensor, a Zigbee sensor and a thermal sensor.

2. The system of claim 1 wherein said one or more sensors are located on one or more devices comprising a laptop, a tablet, a cellular phone and a wearable device.

3. The system of claim 1 wherein said data originates from one or more devices carried by said one or more subjects at said site.

4. The system of claim 3 wherein said one or more devices include a cellular phone, a tablet, a smartwatch, a laptop computer and a wearable device.

5. The system of claim 4 further comprising one or more wireless antennas installed at said site that gather said data from said one or more devices and then provide it to said one or more sensors.

6. The system of claim 3 wherein said distance in said element (d) signifies that a MAC address beaconed by a device amongst said one or devices is in an unused media access control (MAC) address space at said site.

7. The system of claim 1 wherein said distance in said element (d) represents an item selected from the group consisting of a pattern of movements of said anomalous subject, a temperature of said anomalous subject, a police record of said anomalous subject, a lack of a device carried by said anomalous subject, a device left at said site by said anomalous subject, a transfer of a device by said anomalous subject to another subject at said site, and a weapon carried by said anomalous subject at said site.

8. The system of claim 1 wherein said data comprises one or more data-tracks stored in a data file, each of said data-tracks corresponding to a type of sensor amongst said one or more sensors.

9. The system of claim 1 wherein at least one of said one or more sensors are one of integrated with and operably connected to, a device operating at a kiosk at said site.

10. The system of claim 1 wherein at least one of said one or more subjects are assets at said site and at least one of said one or more sensors are asset sensors at said site.

11. A system comprising computer-readable instructions stored in non-transitory storage media and at least one microprocessor coupled to said non-transitory storage media for executing said computer-readable instructions, said at least one microprocessor configured to:
(a) analyze data obtained from one or more sensors, said data related to one or more devices at a site;
(b) establish a rolling baseline for said data by assigning each packet of said data to a cluster of packets amongst a plurality of clusters of packets of said data;
(c) score, based on its distance from a centroid of said rolling baseline, each packet of said data; and
(d) identify based on said distance an anomalous device amongst said one or more devices;
wherein said one or more sensors comprise one or more of a video sensor, an audio sensor, a cellular network sensor, a blue-tooth sensor, a radio frequency identification (RFID) sensor, a Zigbee sensor and a thermal sensor.

12. A computer-implemented method executing computer program instructions stored in a non-transitory storage medium and comprising the steps of:
(a) providing at a site, one or more sensors comprising a video sensor, an audio sensor, a cellular network sensor, a blue-tooth sensor, a radio frequency identification (RFID) sensor, a Zigbee sensor and a thermal sensor;
(b) analyzing data obtained from said one or more sensors, said data related to one or more subjects at said site;
(c) establishing a rolling baseline for said data by assigning each packet of said data to a cluster of packets amongst a plurality of clusters of packets of said data;
(d) scoring, based on its distance from a centroid of said rolling baseline, each packet of said data; and
(e) identifying based on said distance an anomalous subject amongst said one or more subjects.

13. The method of claim 12 locating said one or more sensors on one or more devices comprising a laptop, a tablet, a cellular phone and a wearable device.

14. The method of claim 12 originating said data from one or more devices carried by said one or more subjects at said site.

15. The method of claim 14 providing said one or more devices to include a cellular phone, a tablet, a smartwatch, a laptop computer and a wearable device.

16. The method of claim 15 providing a wireless antenna installed at said site that acts as one of said cellular network sensor, said blue-tooth sensor and said radio frequency identification (RFID) sensor.

17. The method of claim 14 signifying by said distance in said step (e) that a MAC address beaconed by a device amongst said one or devices is in an unused media access control (MAC) address space at said site.

18. The method of claim 12 representing by said distance in said step (e) an item selected from the group consisting of a pattern of movements of said anomalous subject, a temperature of said anomalous subject, a police record of said anomalous subject, a lack of a device carried by said anomalous subject, a device left at said site by said anomalous subject, a transfer of a device by said anomalous subject to another subject at said site, and a weapon carried by said anomalous subject at said site.

19. The method of claim 12 storing said data as one or more data-tracks in a data file, each of said data-tracks corresponding to a type of sensor amongst said one or more sensors.

20. The method of claim 12 providing at least one of said one or more subjects to be a valuable asset at said site and providing at least one of said one or more sensors to be asset sensors at said site.

* * * * *